Figure 1:
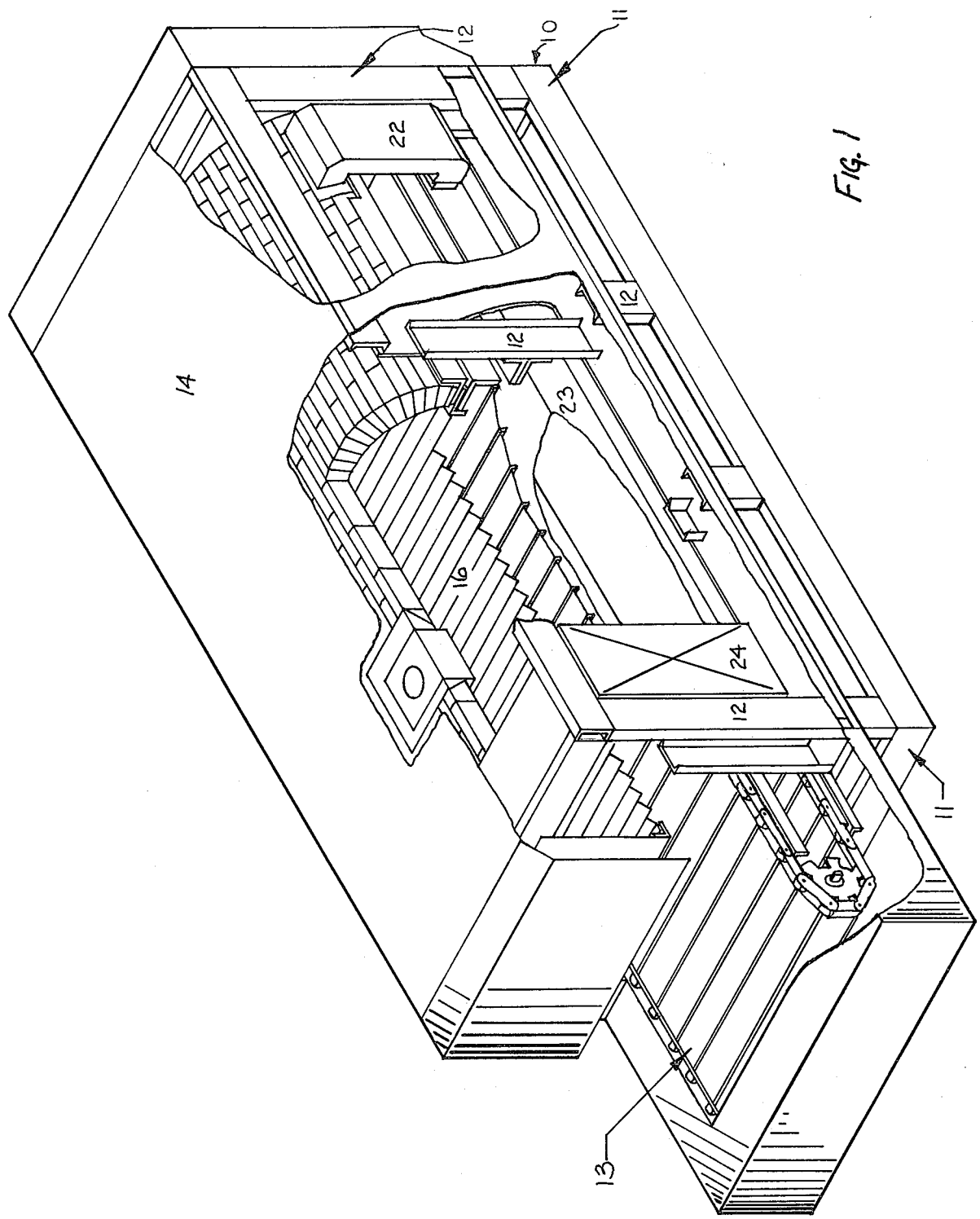

United States Patent [19]

Williams et al.

[11] 4,383,823
[45] May 17, 1983

[54] RADIANT OVEN FOR BAKING BREAD

[76] Inventors: Robert W. Williams, 167 Brookville Rd., Brookville, N.Y. 11545; Vincent Montaruli, 36 Crosby St., Sayville, N.Y. 11782

[21] Appl. No.: 273,089

[22] Filed: Jun. 12, 1981

[51] Int. Cl.$^3$ .............................................. F27B 9/00
[52] U.S. Cl. ..................................... 432/148; 99/386; 99/401; 432/152; 432/188
[58] Field of Search ............... 432/137, 148, 152, 153, 432/188; 99/386, 401

[56] References Cited

U.S. PATENT DOCUMENTS

| | | | |
|---|---|---|---|
| 1,663,117 | 3/1928 | Comstock | 432/148 |
| 2,120,829 | 6/1938 | Bolling | 432/148 |
| 2,949,869 | 8/1960 | Leeuwrik | 432/153 |

FOREIGN PATENT DOCUMENTS 1203613  1/1960  France ............................. 432/152

*Primary Examiner*—John J. Camby

[57] ABSTRACT

This invention provides an oven to produce a desired baking effect while simultaneously providing the bread with a desirable brown coloration in both its top and bottom surfaces. A unique feature of this oven is the provision of a top radiant refractory arch wall and top flame heating to effect a desired radiance to the refractory arch surface, and also to simultaneously produce a desired radiance to a horizontally disposed radiant plate suitably disposed above the bread travelling continuously there beneath. The oven of this invention provides for substantially flash baking of relatively thin bread discs with a suitable crust formation and coloration of both its top and bottom surfaces. This oven provides also a novel method of baking relatively thin bread material. This invention accordingly provides an indirectly fired novel baking oven having novel features, to wit: a tip refractory oven surface for baking purposes supplemented by a specifically provided radiant heat-bank plate for providing a desirable brown crust in a minimum of time. The bread discs travel on a conventional metal conveyor continuously beneath the radiant plate so that a vast number of bread loaves are bakes to perfection in a minimum of time.

4 Claims, 4 Drawing Figures

RADIANT OVEN FOR BAKING BREAD

Arabic bread is of a specific size and shape. It is of small weight and round configuration. Middle Eastern bread is often called Balady Bread in Egypt and Syrian bread in Syria. It is composed of flour, water, yeast, and salt. It is formed into about six inch discs and allowed to rise. The shaped dough is then baked under peculiar conditions such as about one minute at about one thousand (1,000°) degrees Fahrenheit. In this short time span, the bread must be both baked and given a desirable coloration. A conventional baking oven cannot perform this task.

It is an object of this invention to provide a novel top fired baking oven to thereby produce a novel baking effect in a minimum of time and with a maximum of fuel efficiency.

It is another object of this invention to provide a construction of minimum size and maximum quality to take as small a space as possible in the baking plant and adapted to keep the gases of combustion away from the baking bread.

These and other objectives of this invention will become apparent upon reading the following descriptive disclosures of an illustrative embodiment of this invention, shown in the accompanying drawing in which, FIG. 1 is a perspective view of the oven, broken away in part, to show the inner construction of the refractory bricks constituting the heat reflecting arch, the location of the flame burner, the travelling metal plate conveyor, and the various ducts for conducting fuel exhaust gases to preheat the incoming bread.

Figure 3:
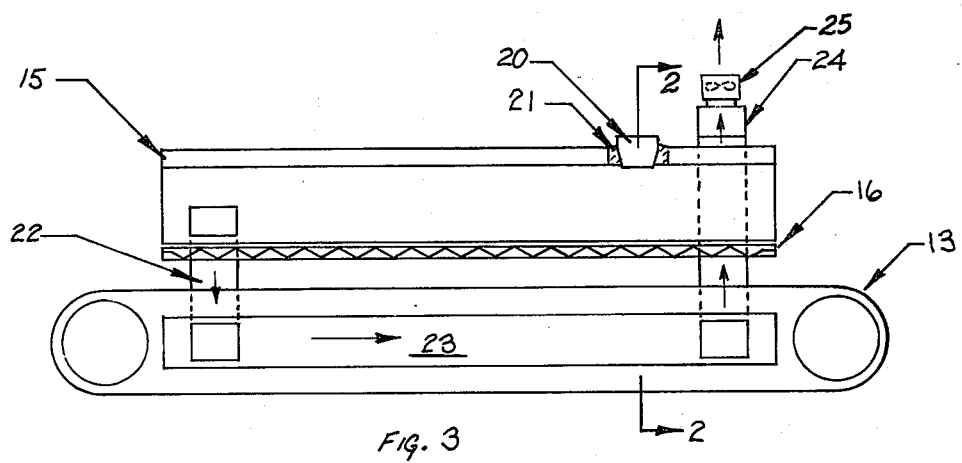
Figure 2:
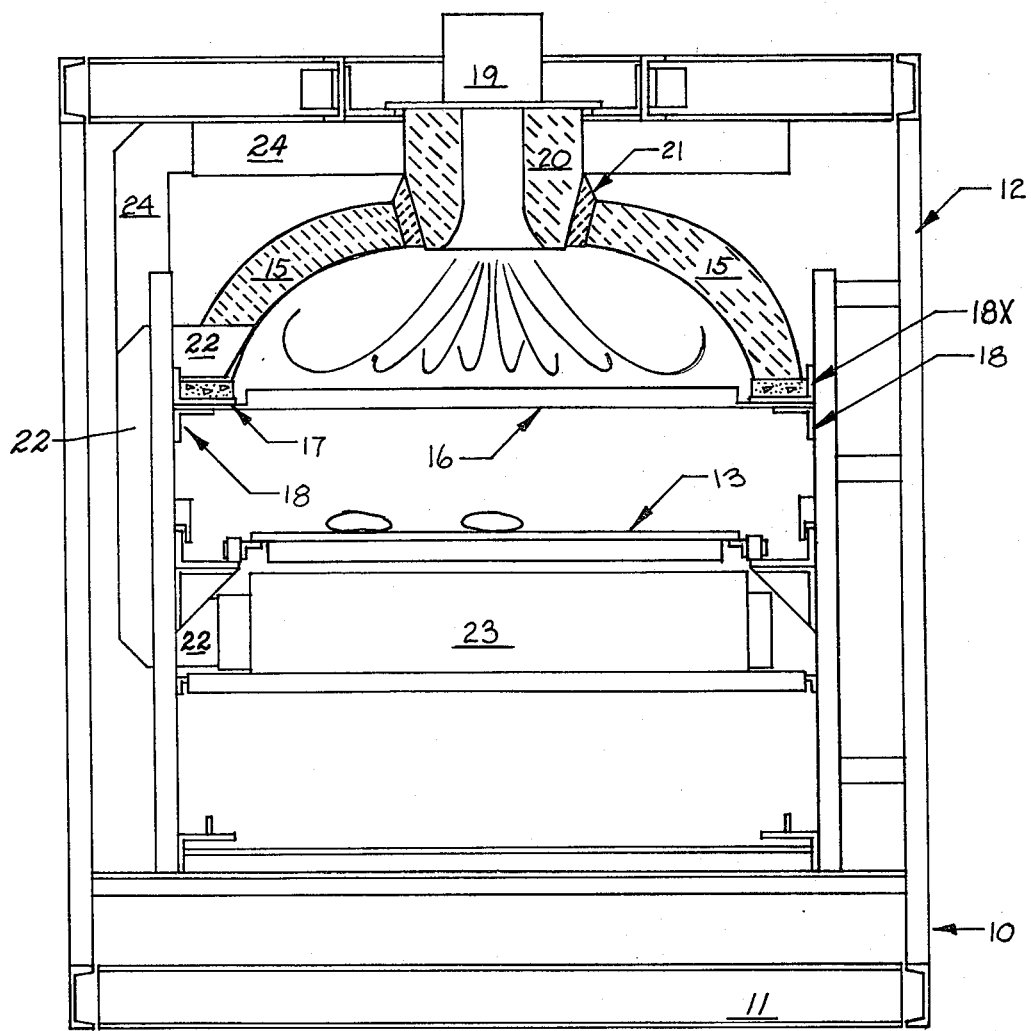

FIG. 2 is cross-section view taken on line 2—2 of FIG. 3, showing the space relationship of the flame burner to the refractory brick arch and the heat bank radiant plate.

Figure 4:
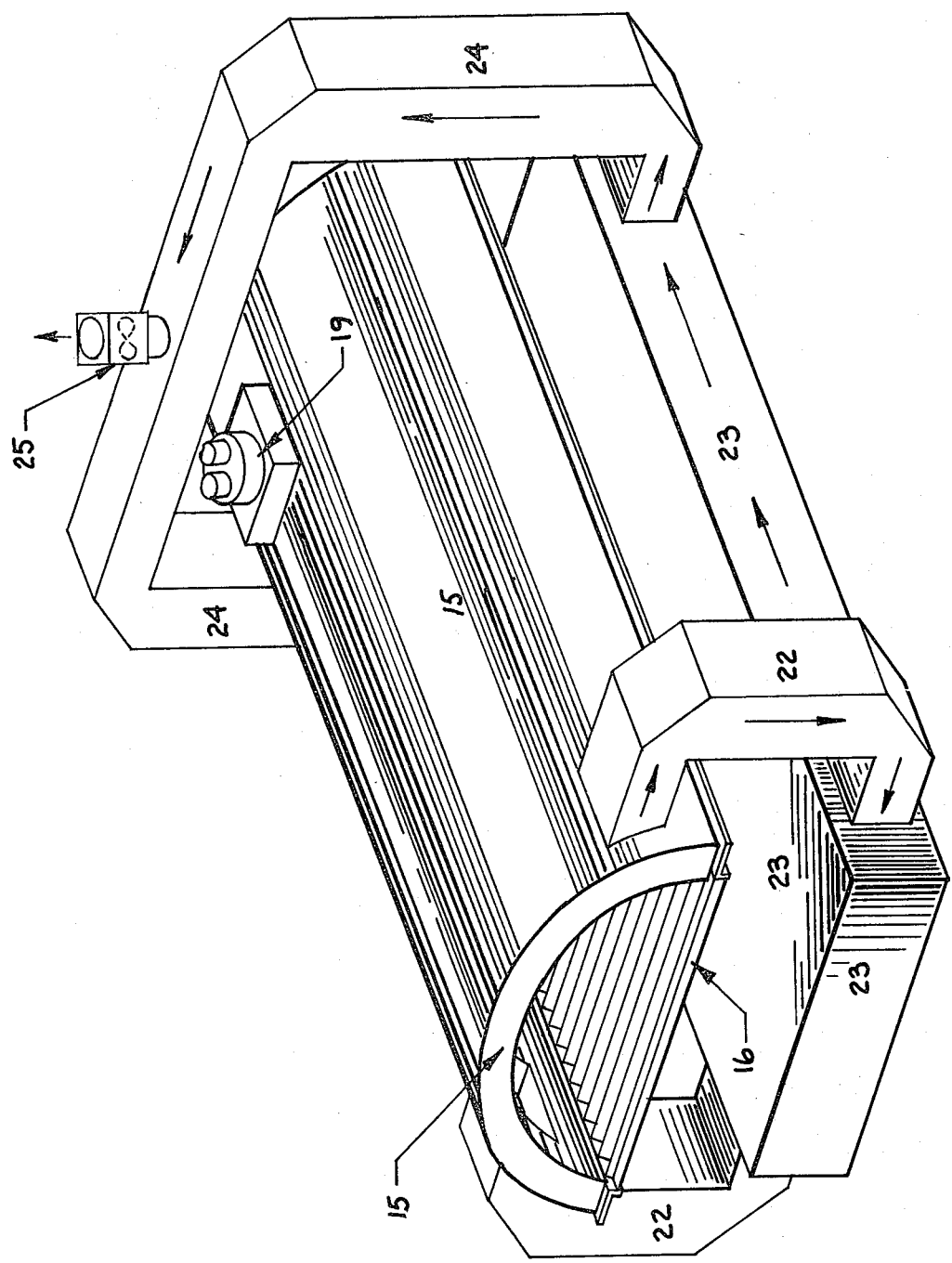

FIG. 3 is a schematic side view of the oven showing the relationship of the baking conveyor to a corrugated horizontally disposed radiant heat baking plate and FIG. 4 is a perspective view of the overall oven with the conveyor removed to show the relationship of the curved oven top heat chamber wall to the radiant heat plate bottom wall thereof and also to show the manner of passage of combustion gases to a heat extracting heat chamber disposed between the two horizontally disposed portions of said conveyor, said conveyor encompassing said heat chamber.

Turning now to the drawing, a structural, generally of rectangular shape, framework 10 is provided with horizontally disposed beams 11 and vertically interconnecting disposed beams 12.

The oven is further provided with a conventional metal multi-plate conveyor 13 and a cover plate 14 to provide a pleasing appearance.

As shown in FIG. 4, the novel features of this invention reside in the provision of a top heat oven chamber formed by a refractory ceramic arched roof wall 15 of a semi-cylindrical configuration, and a preferably serrated elongated horizontally disposed radiant heat plate 16, of sufficient mass and bulk to function as a heat caloric bank to provide uniform radiance, even with the passage therebeneath of a travelling conveyor belt having many loaves of room temperature bread thereon.

As shown in FIG. 1, the roof structure of the top heat chamber is made of ceramic brick of sufficient bulk to absorb a mass of calories of heat to function as a heat bank and to emit radiant heat uniformly even under adverse conditions of bread baking operation.

This refractory brick work co-acts with the serrated radiant heat plate 16, to provide a steady radiant top heat adapted to simultaneously provide a top baking effect with a top coloration effect to provide an arabic bread of a richly brown color and smooth crust texture.

The horizontal opposed edges of plate 16 are each provided with a smooth ledge 17. These ledges 17 are seated on horizontal angle iron rails 18 thereby permitting a minor or leak positive air flow under vacuum from the atmosphere into the combustion chamber and thereby prevent outflow of combustion gases into the bread baking chamber.

The opposed edges of the curved roof 15 likewise engage an angle iron rail 18X in space relationship to the rail 18 and to said opposed edges 17 of plate 16 permitting air flow under vacuum exhaust fan conditions into the combustion chamber formed between the arched roof 15 and serrated radiant plate 16. Radiant plate 16 may optionally be of flat construction, but such is not the preferred form of this plate. Thus, the inflow of air around the edges of roof wall 15 prevents the outflow of combustion gases into the bread baking chamber. As shown in the drawing, the curved roof wall 15 is provided at the front or bread inlet end of the conveyor 13 with a top fuel burner 19 (FIG. 4) set in a suitable burner holder 20, the latter being disposed in seal 21 to the roof wall 15.

The burner 19 is of the spiral flame type using a fuel such as oil or gas to produce a blue-spiral flame. Such a blue flame is particulate free of glowing yellow carbon particles and hence does not form soot to foul up the chamber walls and passages.

The spiral form of the flame is particularly desirable since the energy of the moving spiral flame is moved downwardly, FIG. 2.

This invention shows the use of but one burner 19, but for larger baking ovens of greater length for greater production of bread, two or more burners 19 may be used, suitably spaced apart.

In order to obtain the maximum of fuel energy, the combustion gases are drawn by an exhaust fan created vacuum, along with atmospheric leak air and from around the bottom edge of the roof wall 15, through ducts 22 into a heat chamber 23, disposed between the top and the bottom portions of the horizontally disposed conveyor chain plates 13 (FIG. 3 and 4), thereby transferring heat energy to the top portion of the conveyor 13 upon which the bread loaves are placed.

The combustion gases leave heat chamber 23 by way of exit ducts 24 and into a common exit port to which a conventional suitably powerful exhaust fan 25 is attached to create a necessary strong vacuum to induce atmospheric leak air into the combustion chamber.

FIG. 4 shows an abbreviated exterior of the oven, which preferably is enclosed with a pleasing exterior wall 14.

In the operation of this oven, the bread loaves are continuously fed into the conveyor at the inlet opening near the burners and are removed continuously at the exit opening without need of manual attention, so that the oven is fully automated. The time of baking is reduced to the desired few minutes by suitable adjustment of the baking flame, dampers, if desired, and the exhaust fan.

This invention has been illustrated by a single embodiment but the invention is one of a generic concept and includes top baking with use of a top radiant heat plate, preferably serrated in configuration, said heat radiant plate being heated directly by a burner spiral flame as well as by reflected radiant heat energy from a ceramic top roof wall, also heated by said spiral flame of a suitable burner.

We claim:

1. A baking oven for bread comprising a top radiant heat bank ceramic horizontally disposed oven wall of semi-cylindrical construction having a front portion and rear portion to form a combustion chamber; a bottom radiant heat bank plate means engaging said ceramic wall in a non-air tight relationship to provide leaked air into the combustion chamber; a metal continuous conveyor, having a top portion separated from a bottom portion, disposed beneath said radiant plate and adapted to convey bread loaves in its top portion in suitable space relationship to said radiant heat plate, a burner disposed in the top of said ceramic wall; inlet duct opening means engaging said ceramic combustion chamber; an elongated heat chamber means disposed between the said top and the said bottom portions of said conveyor; exit duct means engaging said elongated heat chamber at its front portion for removal of said combustion gases and leaked air to the atmosphere; and exhaust fan means for producing a vacuum to produce leaked atmospheric air beneath the ceramic wall and into the combustion chamber whereby combustion gases are prevented from entering the bread baking area of the oven.

2. The oven of claim 1 wherein the radiant heat plate is provided with a serrated configuration.

3. The oven of claim 2 having a plurality of burners in the top of the ceramic refactory wall.

4. The oven of claim 1 wherein the radiant heat plate is of substantially flat configuration.

* * * * *